United States Patent [19]

Ratke et al.

[11] Patent Number: 5,027,929
[45] Date of Patent: * Jul. 2, 1991

[54] SOLENOID SYSTEM FOR, FOR EXAMPLE, A BRAKE/SHIFT INTERLOCK FOR VEHICULAR TRANSMISSION CONTROL

[75] Inventors: Richard Ratke, Dearborn; Donald E. Ellison, Mount Clemens, both of Mich.

[73] Assignee: United Technologies Automotive, Inc., Dearborn, Mich.

[*] Notice: The portion of the term of this patent subsequent to Dec. 19, 2006 has been disclaimed.

[21] Appl. No.: 440,554

[22] Filed: Nov. 20, 1989

Related U.S. Application Data

[63] Continuation-in-part of Ser. No. 206,255, Jun. 13, 1988, Pat. No. 4,887,702.

[51] Int. Cl.$^5$ ................... B60K 41/26; B60K 41/04; H01F 7/08
[52] U.S. Cl. ................... 192/4 A; 29/602.1; 70/248; 70/254; 74/878; 335/255
[58] Field of Search ........... 29/602.1; 74/878; 192/4 A, 4 C; 70/248, 254; 335/126, 251, 255, 261

[56] References Cited

U.S. PATENT DOCUMENTS

| 2,102,761 | 12/1937 | Strobel | 335/261 |
|---|---|---|---|
| 2,437,406 | 3/1948 | Rogers | 335/255 |
| 2,616,955 | 11/1952 | Dube et al. | 335/255 |
| 3,629,747 | 12/1971 | Findley, Jr. | 335/255 |
| 3,942,614 | 3/1976 | Thompson | 192/4 A |
| 4,096,930 | 6/1978 | Viscardi | 192/4 A |
| 4,097,833 | 6/1978 | Myers | 335/261 |
| 4,473,141 | 9/1984 | Mochida | 192/4 A |
| 4,474,085 | 10/1984 | Devogelaere et al. | 74/878 |
| 4,513,276 | 4/1985 | Kubota et al. | 340/52 R |
| 4,532,824 | 8/1985 | Lamy et al. | 74/475 |
| 4,660,443 | 4/1987 | Simancik | 74/878 |
| 4,887,702 | 12/1989 | Ratke et al. | 192/4 A |

FOREIGN PATENT DOCUMENTS

| 1265869 | 4/1968 | Fed. Rep. of Germany | 335/255 |
|---|---|---|---|
| 2139510 | 2/1978 | Fed. Rep. of Germany | 335/255 |
| 55-63809 | 5/1980 | Japan | 335/255 |
| 56-70613 | 6/1981 | Japan | 335/255 |
| 643982 | 1/1979 | U.S.S.R. | 335/255 |
| 2104730 | 3/1983 | United Kingdom | 335/255 |

Primary Examiner—Allan D. Herrmann

[57] ABSTRACT

A brake/shift interlock for, e.g., a vehicle having a shift mechanism (10) for an automatic transmission. The shift mechanism includes a shift lever (12) and a detent mechanism (24) having a latch (26) and latch plate (28) with a detent notch at the "Park" position. A Park/Lock member (34) is actuable to lock the latch in the Park position (FIGS. 1 and 6). In addition to an ignition lock mechanism (38) for actuating the Park/Lock member based on the status of the ignition switch (36A; FIG. 8), a brake/shift interlock is also provided for actuating the Park/Lock member when the ignition switch is in "Run" position (FIG. 2), except for being released during actuation of a brake switch (82). A solenoid (160; FIGS. 4 and 5), when energized, applies a tensioning force to the Park/Lock member via a cable (44) actuating the P/L member. The solenoid includes a plunger (162) having an centrally located, axial opening (171) through it, through which the cable extends. The plunger opening is stepped, providing a seat (170) into which a laterally extended, mushroom-shaped button (173) affixed to the cable is seated, with the cable and plunger thereby being interfaced for movement in unison. The solenoid can be completely assembled in manufacture before being interfaced in engagement with the button staked to the cable. The brake/shift interlock may be mechanically in series (FIGS. 1-3) or in parallel (FIGS. 6 and 7) with the ignition lock mechanism. In the series arrangement, the cable of the ignition lock mechanism extends axially completely through the solenoid. (Exemplary power circuitry is illustrated in FIG. 8.)

13 Claims, 7 Drawing Sheets

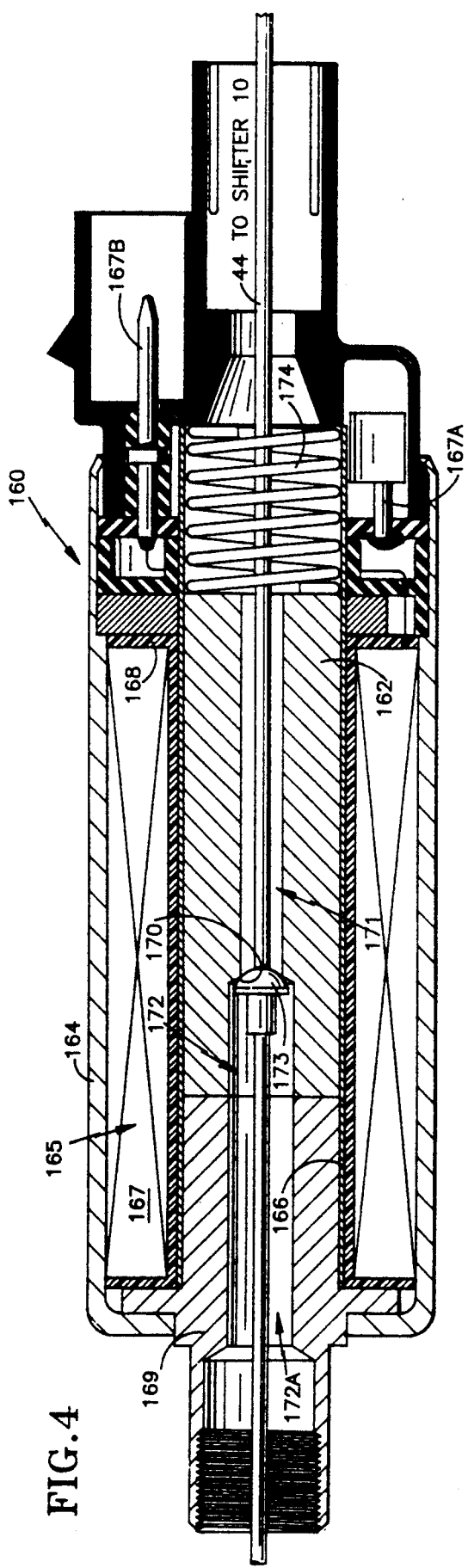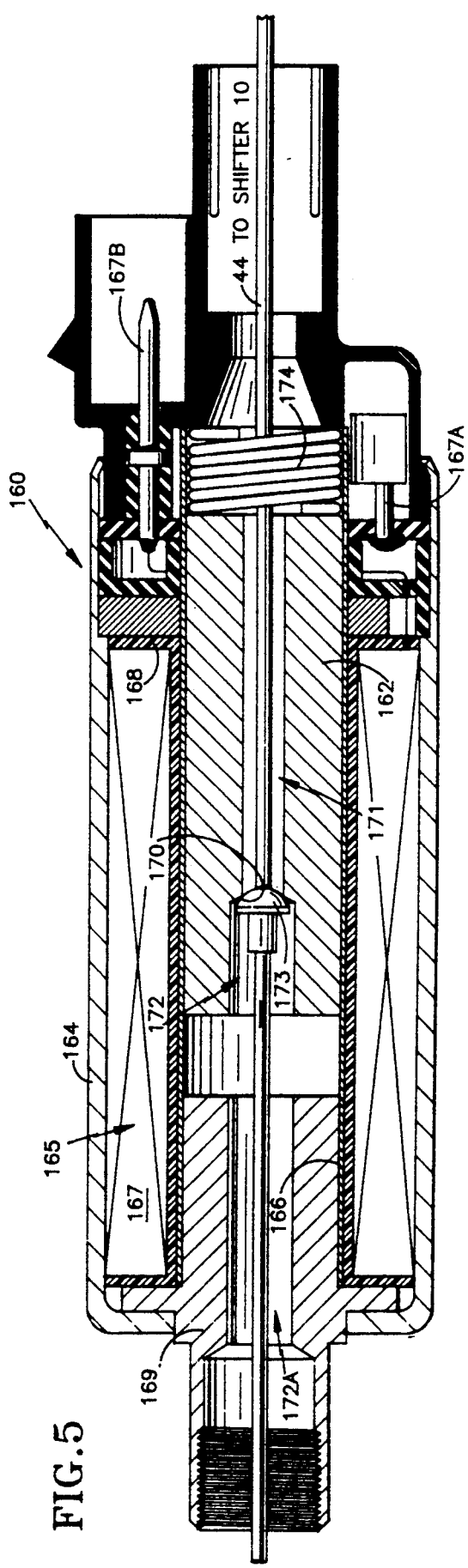

SOLENOID SYSTEM FOR, FOR EXAMPLE, A BRAKE/SHIFT INTERLOCK FOR VEHICULAR TRANSMISSION CONTROL

REFERENCE TO RELATED APPLICATION

This application is a continuation-in-part of co-pending application Ser. No. 07/206,255 entitled "Brake/-Shift Interlock for an Automatic Transmission Shift Control Mechanism" filed June 13, 1988, being issued as U.S. Pat. No. 4,887,702 on Dec. 19, 1989, the disclosure of which is incorporated herein by reference. It is noted that FIGS. 1-3 and 6-8 hereof are substantively identical to those figures in the parent case.

TECHNICAL FIELD

This invention relates to the shift control mechanism for an automatic transmission and more particularly to a brake/shift interlock for the shift control mechanism of an automatic transmission in a vehicle, such as an automobile or the like. The present invention also relates to an improved solenoid design and various manufacturing techniques in the making of the brake/shift interlock.

BACKGROUND ART

In vehicles such as, for example, automobiles, it is common to employ an automatic transmission. The transmission is capable of being placed in either a "Park" mode or various non-"Park" modes by manual actuation of a shift control mechanism. The non-Park modes typically include "Reverse," "Neutral," "Drive," "Second" and "First."

The shift control mechanism typically includes a shift lever which is either floor mounted or may be column mounted on the steering column. In most such shift control mechanisms there is provided a detent mechanism, which interacts with the shift lever to aid in maintaining it in a selected position associated with a selected transmission mode.

Many such automatic transmission shift control mechanisms include provision for locking the shift lever in the Park detent position, while the ignition switch is in the "Off" position. This aids in theft prevention. An example of such an arrangement is presented in U.S. Pat. No. 4,474,085 (issued Oct. 2, 1984 to DeVogelaere et al), in which a pivotable shift lever has a pushbutton operated, detent mechanism which is operatively connected with a "Park/Lock" lever pivotally mounted on the shift control mechanism. The Park/Lock lever is controlled by actuation of the vehicle ignition lock.

Still further, where there is some concern that a gear shift lever might inadvertently be left in a pseudo-park position, which would allow dislodgement by shock or vibration, possibly into Reverse, provision has been made to insure that the detent pin does find its way into the actual Park detent slot, rather than to dwell at some unacceptable intermediate position.

Such an arrangement is depicted and disclosed in U.S. Pat. No. 4,473,141 (issued Sept. 25, 1984 to Mochida), in which a plunger actuated by an electromagnet acts, when not energized, to insure proper final positioning and retention of the detent pin in the Park position. When the electromagnet is energized, the plunger retracts and the detent pin is freed to allow actuation of the gear shift lever. The electromagnet is connected in series with a park brake switch and the ignition switch such that, when the engine is running and the park brake is actuated, the plunger retracts.

More recently, a concern has developed regarding a condition termed "sudden acceleration," in which the vehicle may lurch forward or backward when the gear shift lever is moved from Park to one of the non-Park positions such as Reverse or Drive. One technique for minimizing or preventing problem acceleration is to require that the brakes be applied while shifting out of the Park position.

While this may normally be good operating practice, it is preferable to provide an interlock, which effectively requires that response. One such brake/shift interlock of which Applicants are aware requires, in addition to the existing shift control mechanism having a key-actuated interlock cam, or Park/Lock member, (hereinafter "P/L" member), a further brake interlock cam for blocking the P/L member, a solenoid having a plunger and rigid arm extensible to actuate the brake interlock cam into actuating engagement with the P/L member when the ignition switch is in the "Run" position and being deactivated when the vehicle's brake is actuated, and a switch for detecting when the shift control mechanism is in the Park position in order to inhibit operation of the solenoid during brake actuation when other than in Park, so as to prevent the noise and wear associated with its actuation.

Accordingly, it is a principal object of the present invention to provide an improved brake/shift interlock for the shift control mechanism associated with the automatic transmission of a vehicle.

It is a further object to provide an improved electromagnetic actuator assembly useful in such brake/shift interlock mechanism.

It is a still further object of the invention to provide such improved brake/shift interlock in combination with the shift control mechanism for an automatic transmission.

As part of the foregoing general objects, it is a further object to provide a reliable brake/shift interlock which may be economically added to an existing shift control mechanism.

It is a further object of the invention to provide an electromagnetic actuator for the brake/shift interlock of a design which permits an economy of functions.

Finally, in comparison to the brake/shift interlock system of the parent case, which likewise had the foregoing objects, it is an additional, primary object of the present invention to further improve the electromagnetic actuator for such a system, particularly in the manufacturing aspects thereof.

With respect to the exemplary solenoid of the parent case, it is noted that the solenoid plunger (62) had to be crimped, staked or otherwise fixedly attached to an actuating cable (44; comparable to the cable 44 hereof). Although a significant advance over the prior art, this approach typically required the cable manufacturer, who was different than the solenoid manufacturer, to attach the solenoid plunger to the cable. This in turn required that the solenoid manufacturer only partially pre-assemble the solenoid and ship the partially assembled solenoid to the cable manufacturer for attaching the cable to the plunger, before the solenoid assembly could then be completed.

This situation also created a tolerancing problem. If the plunger was staked too far toward the shifter, the plunger would not properly seat against the bushing or stop, resulting in a loss of the interlock feature. On the other hand, if the plunger was staked too far toward the column, the cable would not then be able to return, which could result in the driver not being able to remove the key from the ignition switch.

Thus, a further object of the present invention is to overcome these manufacturing and tolerancing problems with respect to the electromagnetic, solenoid actuator for the brake/shift interlock.

DISCLOSURE OF INVENTION

As in the parent case, according to the present invention there is provided a brake/shift interlock for use in a vehicle having a shift control mechanism for an automatic transmission. The transmission has a Park mode and non-Park modes, i.e., modes other than Park.

The shift control mechanism includes a shift lever for controlling selection of the transmission modes and further includes a detent mechanism having a latch and a latch plate. The latch plate includes several detent notches, one of which corresponds with a Park position. The latch is adapted to be in detented engagement with respective ones of the detent notches and is selectively, manually actuable out of the detented engagement with a respective detent notch.

The shift control mechanism preferably further includes a P/L member actuable to lock the latch in the Park position detent notch. The vehicle includes an ignition switch having Off and Run positions, and an ignition lock mechanism is associated with the ignition switch and is connected with the P/L member for actuating that member to a Lock position to maintain the latch locked in the Park position detent notch when the ignition switch is in its Off position.

The vehicle preferably further includes a brake switch connected in an electrical power circuit and adapted to be actuated in conjunction with the actuation of a brake pedal or the like. The brake/shift interlock includes an electromagnetic actuator, such as a solenoid, and includes means such as a flexible cable or the like for mechanically connecting it directly with the P/L member.

The solenoid is adapted to be connected electrically in the brake light power circuit, which includes the brake switch, so as to control its actuation as a function of the actuation of that brake switch. Energizing of the solenoid serves to move the connecting means, which joins the solenoid with the P/L member, to thereby urge that member into the Lock position.

The P/L member preferably is mounted on a pivot axis, and the ignition lock mechanism operates to apply an off-axis force to that member to actuate it toward the Lock position to lock the latch in the Park position. Moreover, the brake/shift interlock is connected with the P/L member in a similar off-axis manner to effect the same response of the P/L member when the solenoid is energized.

In one embodiment of the invention, the solenoid and its connecting means exists mechanically in parallel with the ignition lock mechanism. In another perhaps more preferred embodiment of the invention, the solenoid and its connecting means are arranged mechanically in series with the ignition lock mechanism. More specifically, the latter embodiment employs a cable normally associated with the ignition lock mechanism to also provide the connecting means associated with the brake/shift interlock solenoid.

Still further, and in accordance with a further aspect of the invention, as in the parent case, the brake/shift interlock solenoid may be of a novel construction, in which an opening extends axially through the solenoid housing and thus also through the solenoid's plunger. The cable of the ignition lock mechanism passes through the solenoid housing and its plunger for connection with the P/L member at one end and with the ignition lock mechanism at the other. The solenoid plunger is in interfacing engagement with the cable, such that the two are moved in unison relative to the solenoid.

The power circuit in which the brake/shift solenoid is connected preferably employs a battery potential applied to one side of the ignition switch, while the other side of the ignition switch is connected to one side of the solenoid, and the other side of the solenoid is connected to a junction. This junction includes one side of a brake lamp and one side of the brake switch, the other side of the brake lamp being connected to ground potential and the other side of the brake switch being connected to the battery potential.

The solenoid is thus energized through the lamp when the ignition switch is in the Run position. However, when the brake switch is actuated, the voltage difference across the solenoid will be nil, thereby causing it to be de-energized.

In a still further aspect, and indeed in accordance with a primary aspect of the present invention, in contrast with the exemplary solenoid of the parent case, the brake/shift interlock solenoid includes a first, smaller diameter, axial opening through the solenoid plunger and a second, counter-bored, larger diameter, axial opening though the plunger, at the end of which larger opening a seat is provided.

Interfacing with the seat is preferably a mushroomed-shaped, button member fixedly attached to the cable. This interfacing causes the cable and plunger to move together.

In the final, over-all system assembly, the cable button member, which is fixedly attached to the cable by the cable manufacturer, can be inserted and slipped into a completely assembled solenoid, through the back, larger diameter opening. The button member, having a larger diameter than the smaller diameter opening, then seats into the seat at the bottom of the counter bore, causing the cable and the plunger to move together when the solenoid is actuated.

This allows the solenoid manufacture to manufacture a completely assembled solenoid, without requiring the interim step of partial assembly with interim shipment to the cable manufacture for attaching the cable to the plunger.

It also allows acceptable tolerancing. With this new construction and design, if the button is staked slightly to the left (when viewed from the perspective of FIGS. 4 and 5 hereof), the result is a small amount of movement of the cable before the interlock force is felt without inhibiting the cable from returning toward the column and locking out the key.

Other features and advantages will be apparent from the specification and claims and from the accompanying drawings, which illustrate at least one exemplary embodiment of the invention.

BRIEF DESCRIPTION OF DRAWINGS

FIG. 1 is a perspective view, partially in cross-section and partially cutaway and broken away, depicting a first embodiment of the brake/shift interlock of the invention in combination with a shift control mechanism for an automatic transmission shown in its locked, Park position; while

FIG. 4 is a side, cross-sectional view depicting the preferred, improved embodiment of a solenoid particularly suited for use in the brake/shift interlock of FIGS. 1-3, including a cable, having a button engaging interface with the stepped, axial opening in the solenoid plunger, extending therethrough and being shown in the energized (or at least spring biased) state; while FIG. 5 is a side, cross-sectional view showing the solenoid and cable combination of FIG. 4, but with the solenoid in its de-energized state and the cable and solenoid having been pulled to the right against the biasing force of the internal biasing spring.

FIG. 6 is a perspective, partial view, depicting a second, exemplary embodiment of a brake/shift interlock in combination with the shift control mechanism, shown in its locked, Park position similar to the first embodiment as illustrated in FIG. 1; while

BEST MODES FOR CARRYING OUT THE INVENTION

Figure 1:
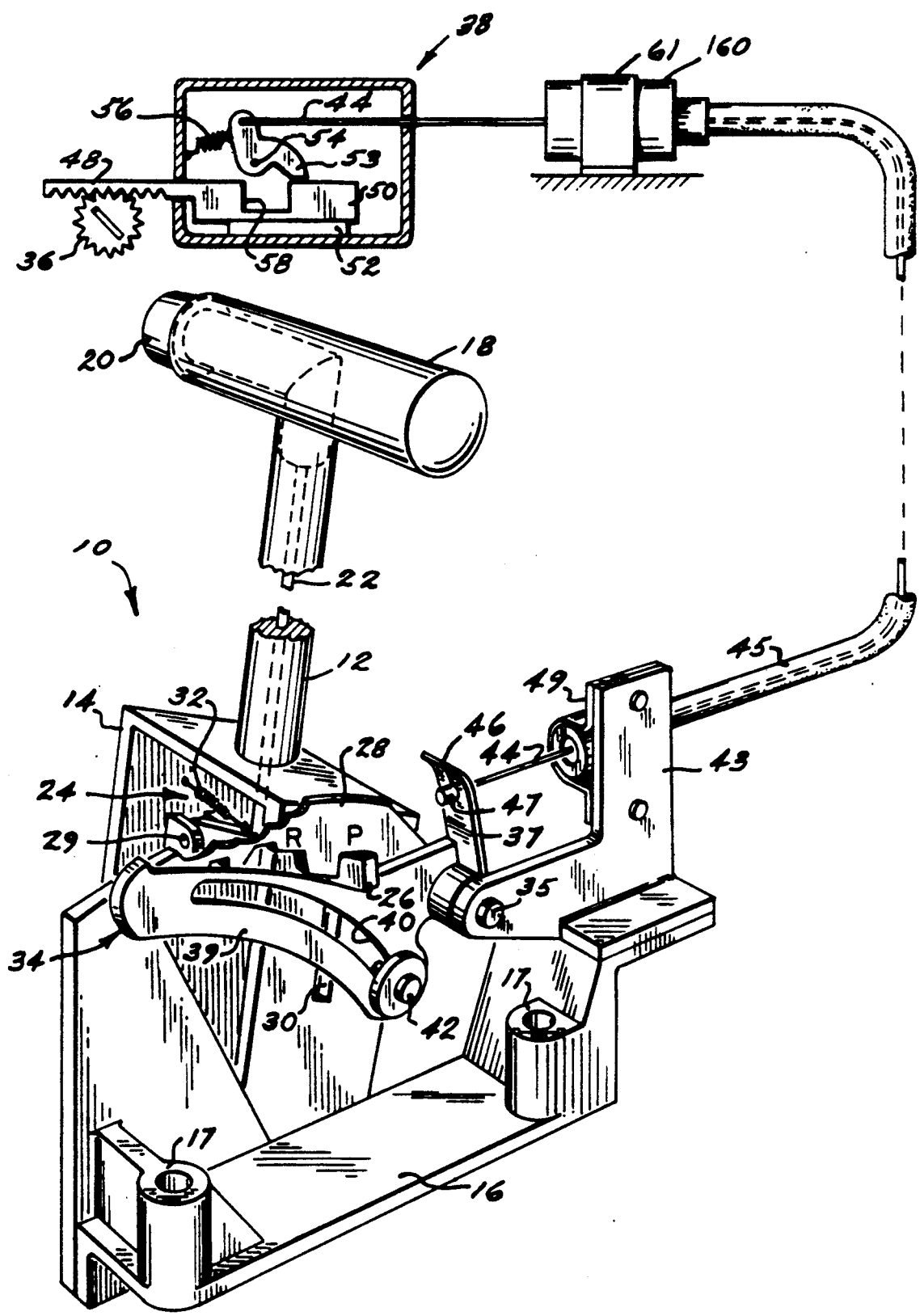
Figure 2:
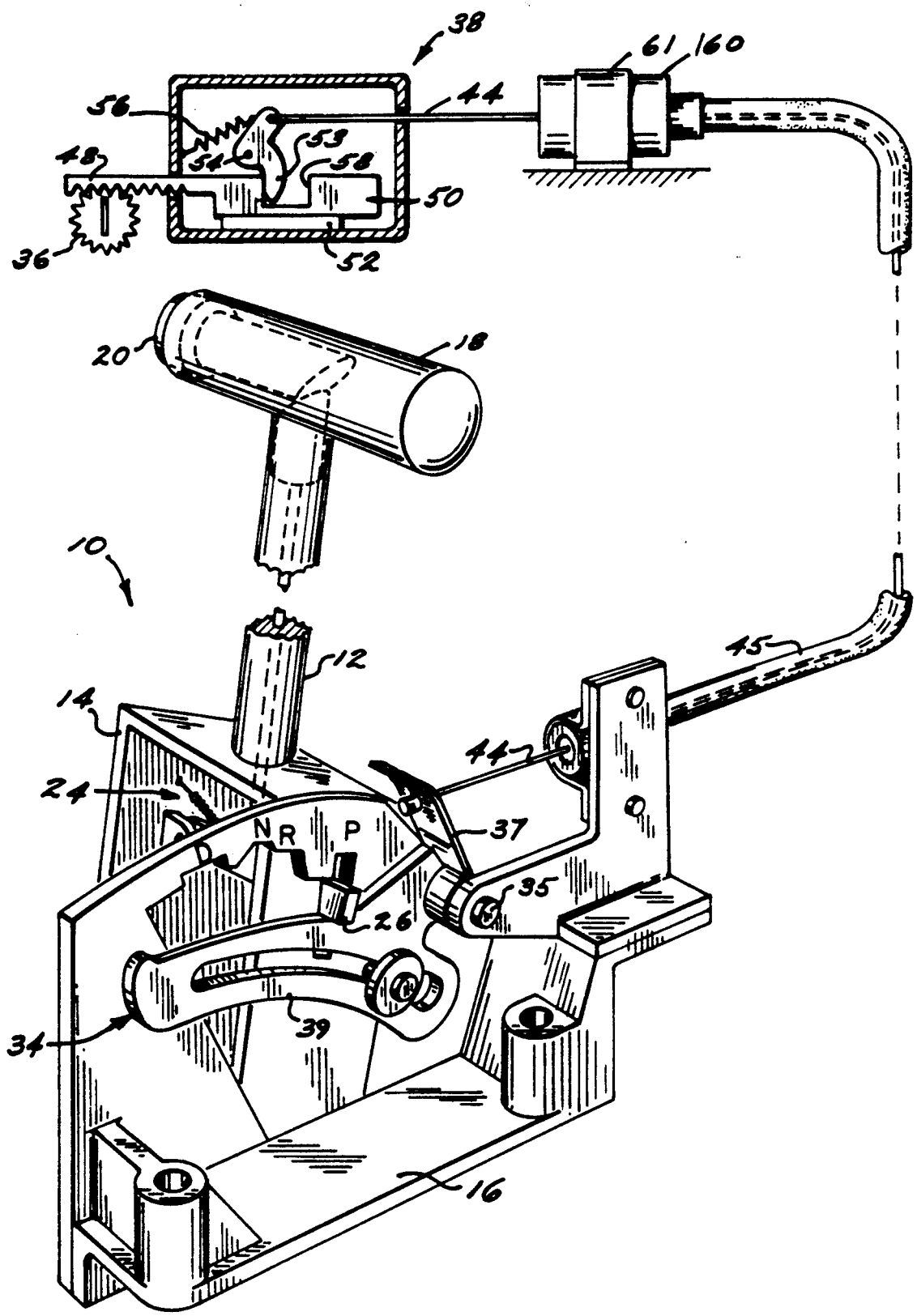
FIG. 2 is a perspective view, partially in cross-section and partially broken away, depicting the brake/shift interlock and shift control mechanism of FIG. 1, but shown in the unlocked, Park position.
Figure 3:
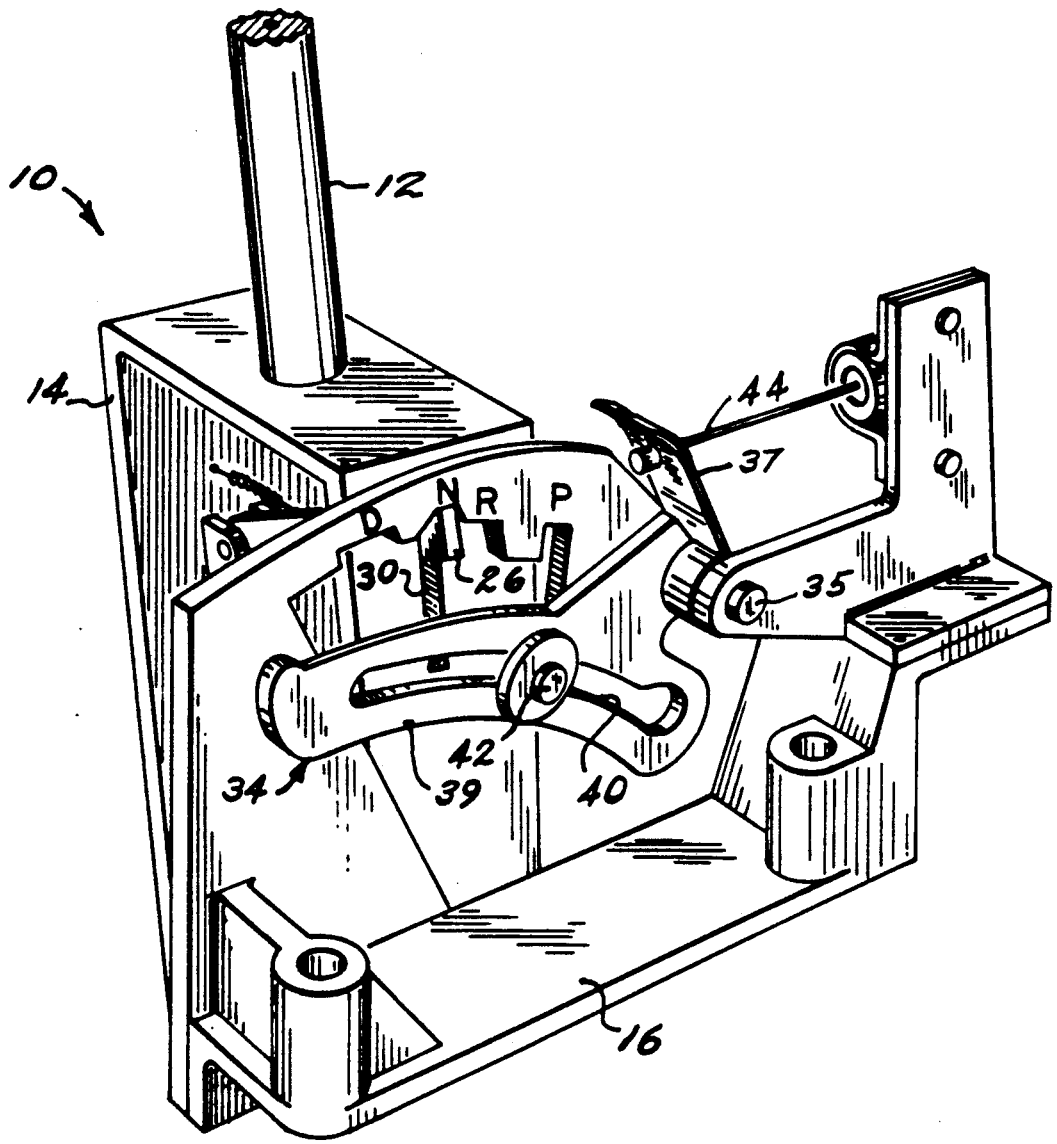
FIG. 3 is a perspective, partial view, depicting the brake/shift interlock and shift control mechanism of FIGS. 1 and 2, being shown in a non-Park position ("N" - neutral).

1st Brake/Shift Interlock Embodiment (FIGS. 1-3)

Referring to FIGS. 1-3, and initially to FIG. 1, there is depicted a shift control mechanism, generally designated 10, for an automatic transmission (not shown). The shift control mechanism 10, or simply shift control 10, is depicted as being of the type which is floor mounted in the vehicle (not shown for purposes of simplicity), though it will be appreciated that the following disclosed principles of the invention would be similarly applicable to a shift control mounted elsewhere in the vehicle, as for instance on the steering column.

Moreover, while the shift control 10 depicted in the figures herein is of a particular type typically found in vehicles manufactured by Ford Motor Company, it should be understood that the brake/shift interlock of the invention is similarly applicable to shift controls of other similar, but not identical, construction; as for instance those disclosed in the aforementioned U.S. Pat. Nos. 4,473,141 and 4,474,085. Resort may be made to the disclosures of those aforementioned patents for a more complete understanding of various shift control mechanisms, as they relate in common to the present invention but are not described in detail herein.

Shift control 10 includes a shift lever secured to a bracket or yoke 14, which is pivotally mounted on a base member 16 in a conventional manner (not shown) for movement about a respective pivot axis. The base member 16 is secured to a body member such as a floor pan (not shown) by a plurality of fasteners (not shown) installed through respective mounting bosses 17.

The shift lever 12 has secured to the upper end thereof a handgrip member 18 which includes a pushbutton 20 disposed therein. The pushbutton 20 is connected through a push rod 22 to a detent mechanism generally designated 24.

The detent mechanism 24 includes a latch 26 and a latch plate 28. The detent latch plate 28 is secured to the base member 16 and includes an interior cutout or open portion, the upper end of which defines various detent notches, respectively designated "P" (Park), "R" (Reverse), "N" (Neutral), "D" (Drive), etc. The latch 26 takes the form of a lever, which is pivoted at its inner end at a pivot axis 29 formed near an inner wall of the yoke 14.

The lever of latch 26 extends from axis 29 outward through a vertical slot 30 formed in the opposite wall of the yoke 14 for generally vertical reciprocation into and out of detenting engagement with the detent notches P, R, N, D, etc. A spring 32 is connected between the yoke 14 and the latch 26 for biasing the latch in an upward direction.

Since the push rod 22 extends between pushbutton 20 and the upper surface of latch 26 between its pivot 29 and its outer end, the bias force of spring 32 similarly acts to bias the pushbutton 20 and the connecting rod 22 into their non-actuated positions shown in FIG. 1.

The bias force of spring 32 is relatively modest. A relatively light manual inward force of, for example, approximately six (6 lbs.) pounds on pushbutton 20 is operative to urge the push rod 22 downward, thereby pivoting the outer end of latch 26 downward in its slot 30. Such downward actuation of latch 26 is required to permit the shift lever 12 to be pivoted from the Park position to one of the other positions P, R, N, D, etc.

However, as noted above, it has also become common to provide a P/L cam or member 34. The P/L cam 34 operates in conjunction with the key lock cylinder 36 associated with ignition switch 36A (depicted in FIG. 8) and an associated ignition lock mechanism 38 to lock the latch 26 into the Park detent notch in yoke 14 under certain circumstances, and thereby lock the shift lever 12 and the entire shift control mechanism in that position.

The P/L member 34 in the illustrated embodiment is mounted for pivotal movement about a pivot axis 35, as represented by a journal pin or rivet in the illustrated embodiment. The pivot axis 35 is fixed with respect to the base member 16 and is conveniently supported either directly or indirectly by the base member 16. The P/L member 34 may take the very general shape of a bell-crank having one upstanding arm 37 adapted to receive an actuating force and a second arm 39 adapted to engage the underside of the outer end of latch 26 for urging the latch upwardly into a locked position within the Park detent notch.

The P/L member 34 includes an arcuate slot 40 extending for much of the length of its arm 39 to provide a cam surface. A cam pin 42 is in fixed engagement with the sidewall of the yoke 14 of shift lever 12 and extends outward through the cam slot 40. The positioning of the cam pin 42 and the contour of the cam slot 40 are such that, as the shift lever 12 is pivoted between the various operating positions, the arm 39 of the P/L member 34 is either caused to pivot away from locking engagement with latch 26, or conversely, is permitted to be drawn upward via arm 37 for such locking engagement.

As in the aforementioned U.S. Pat. No. 4,474,085, when the shift level 12 is in the Park position, the P/L member 34 may be actuated into locking engagement with the latch 26 by means of a substantially inelastic or relatively inextendible, connecting line 44 (preferably in the form of a cable) connected in tension between the P/L arm 37 and the ignition lock mechanism 38.

Cable 44 is typically a flexible but substantially inelastic wire, which is slidingly housed in a surrounding protective jacket 45. The jacket 45 is fixedly positioned at its end closest to P/L arm 37 by being clamped to support bracket 43 by clamping bracket 49. The support bracket is rigidly affixed to, and may be an integral part of, base 16.

P/L arm 37 may include, as illustrated, a slot 46 extending in from one edge and into which the cable 44 is placed. A head 47 on the end of the cable 44 serves to transmit a tensile force on the cable to the arm 37 and further resists dislodgement of the cable from the slot 46.

The ignition lock mechanism 38 associated With key lock cylinder 36 is depicted in a generalized, diagrammatic form herein. The key lock cylinder 36 is in toothed engagement with a rack 48 connected to a slide 50.

As the cylinder 36 is rotated clockwise from the Off position depicted in FIG. 1 to the On or Run position depicted in FIG. 2, the slide 50 is caused to reciprocate to the right on support 52. Such actuation of slide 52 serves also to close the contacts of the ignition switch 36A, seen in FIG. 8.

The ignition lock mechanism 38 further includes a bell crank type lock member 53 pivotally mounted on pivot axis 54 and biased by spring 56 to a withdrawn or retracted position depicted in FIG. 1. Though spring 56 is depicted for simplicity as a tension spring, it could also be provided in the form of a torsion spring or the like.

In that retracted position, the geometry and positioning of the lock 53 and slide 50 are such that, assuming the key lock cylinder 36 is Off, the lock member 53 will be blocked from clockwise rotation. Accordingly, the cable 44, which is connected at its upper end to the other crank leg of lock member 53, is also retained in a withdrawn and locked position.

A notch 58 is provided in the upper surface of slide 50 and is of such depth and positioning that when key lock cylinder 36 is rotated clockwise to the On position depicted in FIG. 2, the slide 50 moves to the right and brings notch 58 into alignment with the end of lock member 53, thereby allowing clockwise rotation of the lever against its biasing spring 56 in the event a superior tensioning force is applied to the downstream end of the cable 44. Such superior force may be applied by the latch lever 26 in response to the manual actuation of pushbutton 20, which requires a force of, for example, about ten (10 lbs.) pounds to overcome the bias of springs 32 and 56. That situation is depicted in FIG. 2.

In addition to the locking of the shift control mechanism 10 in the Park position when the key lock cylinder 36 is in its Off position, the present invention further provides a brake/shift interlock, which is capable of continuing to maintain the shift control mechanism 10 in the Park position, even when the key lock cylinder 36 is in the Run position commensurate with the engine running, and may be released principally only when a brake pedal is actuated to apply the vehicle's brakes. As will be evident, the present invention provides secondary or failure-mode means for releasing the P/L member 34, even in the event that the actuation of the vehicle's brakes does not result in the normal and desired response.

Improved Solenoid System (FIGS. 4 and 5)

In accordance with a primary aspect of this invention, in comparison to the parent case, the brake/shift interlock is provided with an improved electromagnetic actuator, such as the exemplary solenoid 160, operating through a connecting means, such as the cable 44, to either lock or relatively release the P/L member 34 when the shift lever 12 is in the Park position.

Specifically, and referring further to FIGS. 4 and 5, the solenoid 160 includes an internal armature or plunger 162, which engages the cable 44 in a manner resulting in the cable and the plunger moving in unison relative to the solenoid during the operation of the solenoid. The solenoid 160 typically is mounted in a fixed position within the vehicle, as represented by the bracket 61 in FIG. 1.

The solenoid 160 includes a generally tubular, outer housing 164, in which is fixedly positioned a coil assembly 165 comprised of a central, cylindrical shell 166 and an insulated spool 168, on which is wound a conventional, multi-turn electrical coil 167.

The coil assembly 165 and the housing 164 include a coaxial, central opening extending therethrough forming a hollow core. A tubular, electromagnetic, stop member 169 is inserted and fixed in one end of the housing 164, as by, for example, being press-fitted and/or in bonded engagement therewith.

The plunger 162 is tubular, having a stepped, hollow core 171/172 (or other form of axial opening) extending centrally, axially therethrough, with a central axis coincident with the hollow core of the coil assembly 165 and the housing 164. The plunger 162 is sized to reciprocate within the hollow core of the coil assembly 165 at the end opposite to that in which the stop member 169 is positioned, which may be termed the "distal end" of the solenoid, i.e., distal to the axially movable plunger.

As can be seen in the figures, the brake/shift interlock solenoid 160 preferably includes a first, smaller diameter, axial opening 171 through the solenoid plunger 162 and a second, back, counter-bored, larger diameter, axial opening 172 though the back end of the plunger (and the stop member 169), into which larger opening an inclined, seating surface 170 is provided. Thus, the openings 171, 172 in combination provide two, in-line, cylindrical, axially coincident, axial openings of different diameters.

However, it should be understood that the stepped, axial opening through the plunger 162 could effectively be formed with only one, uniformly dimensioned, cylindrical opening through the plunger, as long as the lateral dimension or diameter of the axial opening 172A in the stop member 169 was larger. In this alternate embodiment the relatively smaller diameter opening 171 would extend all the way through the plunger 162. In this instance the seat formed by the stepped, axial opening would then be the side, end face or side, end surface facing the distal end of the solenoid, which side, end surface would be exposed through the opening 172A to the outside of the solenoid to be engaged by the laterally extended member affixed on the cable.

With respect to the embodiment illustrated, engagingly interfacing with the seat 170 is a laterally extended, mushroomed-shaped, button member 173 fixedly attached to the cable by, e.g., being staked to it during manufacture. The exterior, lateral dimensions of the button member 173 are less than the diameter of the larger opening 172, allowing it to enter the openings through the "rear" of the solenoid 160, but greater than the diameter of the smaller, front opening 171, so that it can not pass into or through it. The rounded or hemispheric shape of the head of the button member 173 provides for good interfacing with the inclined, radial step of the seat 170 formed by the difference in the diameters of the radial openings 171/172.

In this way the plunger 162 effectively interfacingly engages the cable 44 through the button member 173, so that the plunger and connecting cable move in unison at least in the operatively necessary direction(s) and under the operatively necessary conditions relative to the housing 164 of solenoid 160.

When the cable 44 is attempted to be pulled to the right (from the perspective of FIGS. 4 and 5), the button 173 through its seated engagement pushes against the rear side of the seat 170 in the plunger and hence against the leftward biasing force of an internal spring 174. Thus, e.g.. When the solenoid 160 goes from its energized or spring biased state (FIG. 4) to its deenergized state with the spring bias overcome (FIG. 5), the cable has been pulled to the right, along with the axially moving plunger 162, resulting in the compression of the spring 174. Otherwise, as illustrated in FIG. 4, the cable 44 is pushed and maintained to the left under the action of at least the biasing spring 174 acting on the front end of the plunger 162.

As noted, FIG. 4 depicts the solenoid 160 in its energized state or at least in its spring biased state, in which the plunger 162 is either electromagnetically drawn and/or spring biased axially inward, whereas FIG. 5 depicts the solenoid in its de-energized state with a rightwardly directed, pulling force being applied to the cable 44 sufficient to overcome the biasing force of the spring 174. Thus, assuming the application of some, sufficient external pulling force, as will be explained hereinafter in greater detail, the plunger 162 moves relatively outward (rightward) to the position depicted in FIG. 5.

It should be understood that, with the engaging interfacing the button member 173 with the plunger 162, the cable 44 is free to move to the left, viz. toward the steering column locking out the key, whenever so pulled. In contrast, any movement to the right of the button 173, viz. toward the shifter 10, when the button is in interfacing engagement with the plunger 162, requires a like, rightward movement of the plunger against the force of the biasing spring 174, and, if then energized, also against the electromagnetic force of the solenoid 160 itself.

Returning to a consideration of the brake/shift interlock of FIGS. 1-3, it should be understood that the energizing of solenoid 160 via its coil 167 will result in a tensile force being applied to the cable 44 in the region where it extends from the solenoid to the arm 37 of P/L member 34. This force may typically be such, when considering the mechanical advantage of shift control mechanism 10, that a force of, for example, approximately thirty-five (35 lbs.) pounds is required on the pushbutton 20 to overcome the electro-magnetic attractive force. Such a force is possible if, for example, two hands are used to depress the pushbutton 20, thus providing the secondary or failure-mode means for releasing P/L member 34.

On the other hand, when coil 167 of solenoid 160 is de-energized, it is only necessary to overcome the relatively modest bias force of return springs 56 and 32 and biasing spring 174.

Each of the foregoing assumes clockwise rotation of the lock member 53 is permitted by the ignition 36 being in the Run position.

In the final, over-all system assembly, the cable button member 173, which is fixedly attached to the cable 44 by the cable manufacturer by, for example, staking the button member to the cable, can be inserted and slipped into a completely assembled solenoid 160, through the back, larger diameter opening or counter bore 172. The button member 173, having a larger diameter than the smaller diameter opening 171, then seats into the seat 170 of the counter bore, causing the cable 44 and the plunger 162 to move together When necessary.

This allows the solenoid manufacture to manufacture a completely assembled solenoid, without requiring an interim step of partial solenoid assembly with interim shipment to the cable manufacture for attaching the cable to the plunger, and then return to the solenoid manufacturer for finishing the final solenoid assembly.

It also allows acceptable tolerancing. With the foregoing construction and design, if the button 173 is, for example, staked slightly to the left (when viewed from the perspective of FIGS. 4 and 5 hereof), the result is a small amount of movement of the cable 44 before the interlock force is felt without inhibiting the cable 44 from returning toward the column and locking out the key.

Figure 8:
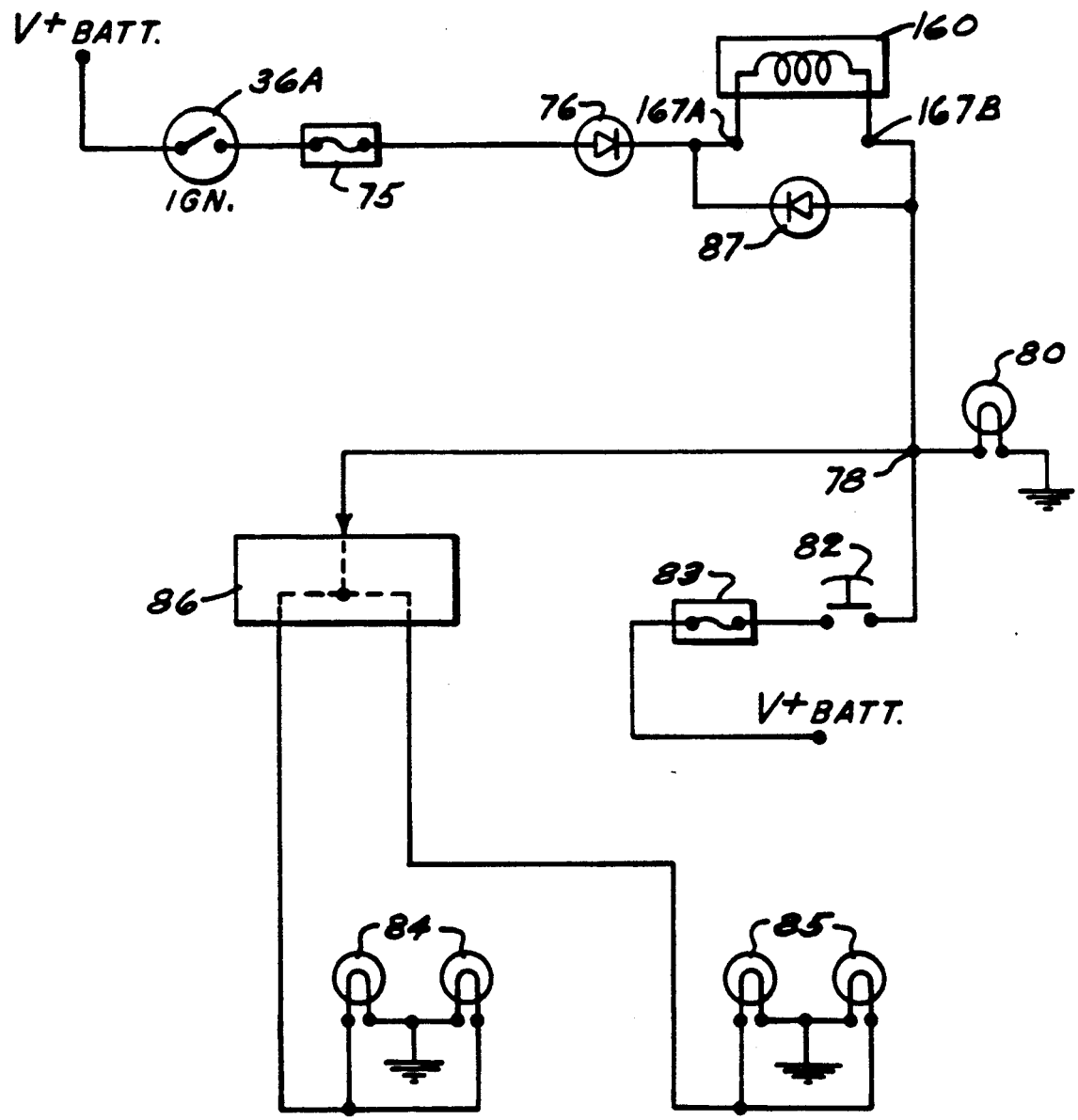
FIG. 8 is a generalized circuit diagram or schematic of the brake light power circuit, which includes the ignition switch, various brake lights and the brake switch, and further showing the brake/shift interlock solenoid included therein in accordance with the invention.

Examplary Power Circuitry (FIG. 8)

Referring to FIG. 8, there is depicted a generalized schematic diagram of the power circuit into Which the ends 167A and 167B of coil 167 of solenoid 160 are connected. Battery voltage of twelve to fourteen (12-14) volts (V+$_{batt}$) is applied to an input terminal of ignition switch 36A. The output terminal of ignition switch 36A extends through a fuse 75 and a steering diode 76 to one terminal 167A of the coil of solenoid 160. In this way, when ignition switch 36A is closed to the Run position, V+$_{batt}$ is applied to terminal 167A of the solenoid 160.

The other terminal 167B of the solenoid 160 is connected to a junction 78, to which is also connected one terminal of a brake lamp 80, having its other terminal connected to ground. Also connected to the junction 78 is one terminal of a normally-open brake switch 82, which has its other terminal connected through a fuse 83 to the battery supply potential, V+$_{batt}$.

Stop lamp 80 may be the conventional high level stop lamp on present day cars. In addition, left and right stop lamps 84 and 85, respectively, may also have one terminal connected to the junction 78 and the opposite terminal connected to ground. Left and right stop lamps 84 and 85 may be connected to junction 78 through a multi-function switch block 86 of conventional design, which may additionally provide the well known turn signalling and hazard signalling functions.

A suppression diode 87 spans the terminal 167A, 167B of the coil of solenoid 160. The brake switch 82 may be of the type conventionally found in automobiles for closing an electrical circuit between V+$_{batt}$ and the various stops lamps 80, 84 and 85 when the operator depresses the brake pedal to actuate the brakes.

When the engine is running, or the ignition switch 36A is simply closed, the battery voltage V+$_{batt}$ is fed to the solenoid 160, and the solenoid is energized by completion of the path through any of the brake lights 80, 84, 85. Since only about, for example, three hundred (300) milliamperes of current is drawn by the solenoid 160, brake lights 80, 84, 85 do not illuminate.

With the coil of the solenoid 160 so energized, the plunger 162 Will be held relatively inward to apply a tensile force to the cable 44, as it extends from the solenoid to P/L member 34 of the shift control mechanism 10. The tensile force on cable 44 applied by the magnetic field of solenoid 160 holds P/L member 34 in the position depicted in FIG. 1 and thus locks latch 26 in the Park detent position, despite the fact that the key lock cylinder 36 is in the Run position and clockwise rotation of the lock member 53 might otherwise have been permitted.

When the brake pedal is depressed, and the brake switch 82 is thereby actuated to its closed condition, V+$_{batt}$ potential is placed on the brake light circuit at junction 78, which thus also places that same potential on terminal 167B of the solenoid 160. Since substantially the same potential, V+$_{batt}$, then appears on both terminals 167A and 167B of the solenoid 160, the solenoid will be de-energized, thereby releasing the plunger 162 and allowing normal shift operation as depicted in FIG. 2.

With the solenoid 160 de-energized during closure of the brake switch 82, the only tensile force being applied to cable 44 is that of the relatively weak return spring 56 in the ignition lock mechanism. On the other hand, a thumb-applied force of, for example, about ten (10 lbs.) pounds on pushbutton 20 is sufficient tO overcome the bias of springs 56 and 32 and allow the latch 26 to be moved downward and similarly displace arm 39 of P/L member 34 downward, as it rotates counterclockwise about pivot 35. This condition is depicted in FIG. 2, from which it will be evident that the shift lever 12 may then be pivoted out of the Park position to one of the other non-Park positions.

When the shift lever 12 is in one of the other non-Park positions as depicted in FIG. 3, the placement of cam pin 42 with respect to the cam slot 40 is such as to hold the P/L arm 34 out of locking engagement with the latch 26. Cam pin 42 holds P/L member 34 in position, despite the solenoid 160 being substantially continuously energized and applying a clockwise torque to member 34 via its connection through cable 44 to arm 37.

Although the solenoid 160 will be de-energized each time the brake is depressed and the brake switch 82 is closed, it will only operate to lock the shift control mechanism 10 in position if the shift lever 12 is in the Park position. Moreover, no noticeable noise resulting from actuation and de-actuation of the solenoid 160 will be heard in any position of the shift control mechanism 10.

Figure 6:
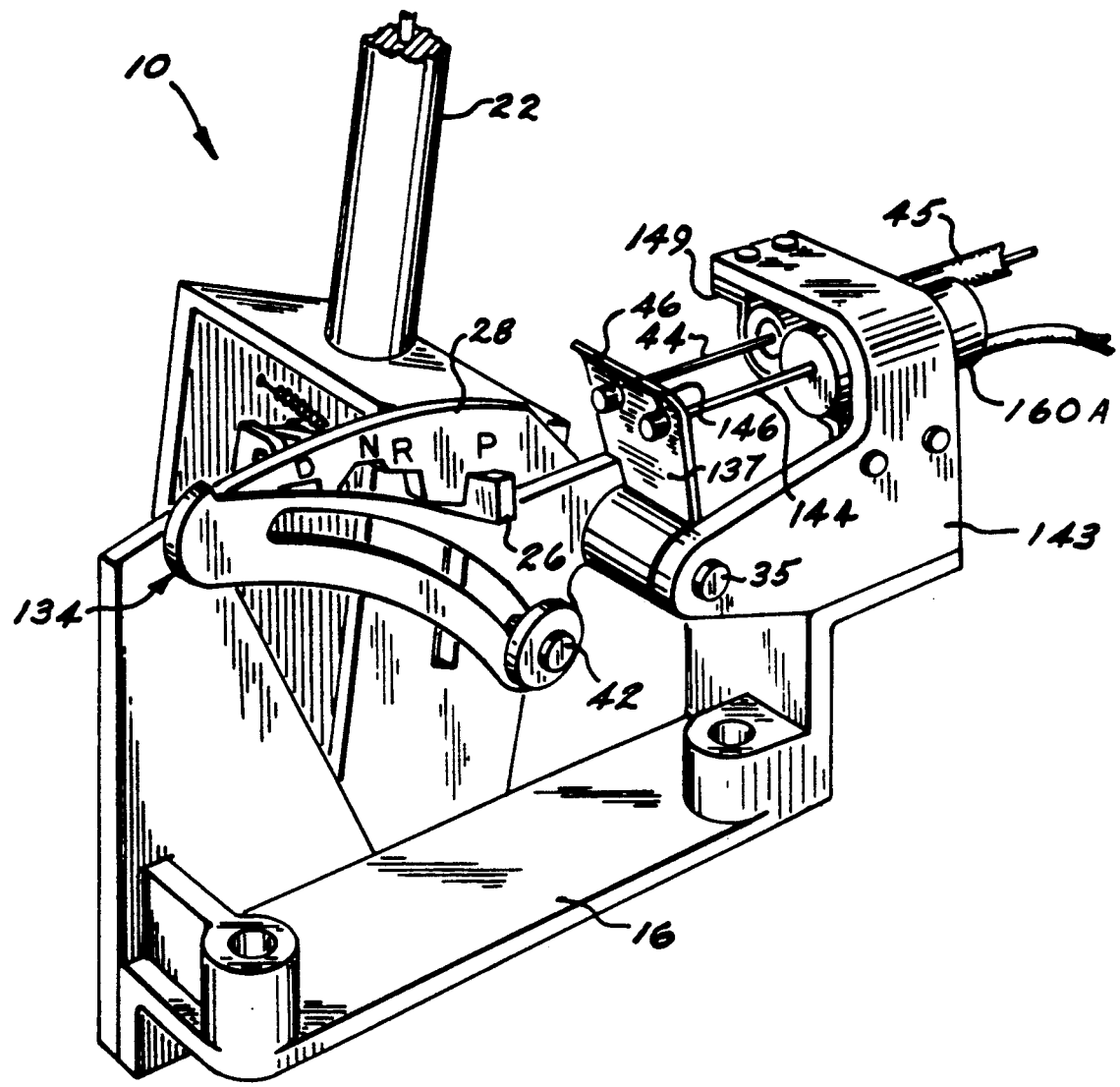
Figure 7:
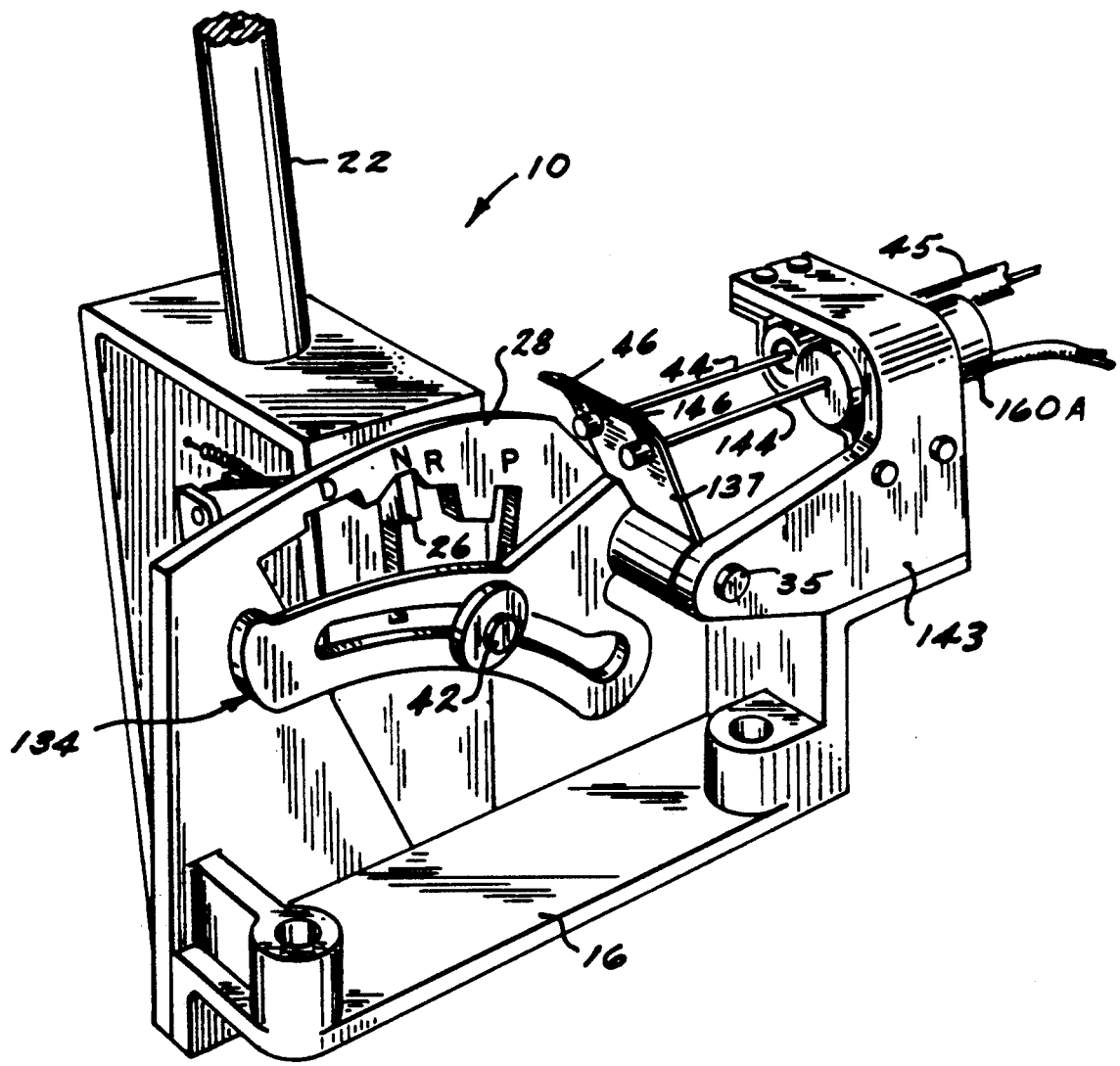
FIG. 7 is a perspective, partial view, showing the brake/shift interlock embodiment of FIG. 6, but with the control shift mechanism depicted in a non-Park position, similar to that shown in the first embodiment in FIG. 3.

2nd Brake/Shift Interlock Embodiment (FIGS. 6 and 7)

Attention is now directed to an alternate embodiment of the brake/shift interlock, as depicted in FIGS. 6 and 7. In those figures, the parts identical to parts previously described in connection with the embodiment of FIGS. 1-3 will bear the identical reference numerals.

The embodiment of FIGS. 1-3, which employed the solenoid construction of FIGS. 4 and 5, depicted the ignition lock mechanism and the brake/shift interlock as being arranged mechanically in series. The embodiment of FIGS. 6 and 7 depicts those two locking functions as being arranged mechanically in parallel.

The arm 137 of P/L member 134 is depicted as being widened and having a pair of slots 46 and 146 for respectively receiving flexible cables 44 and 144, although the single slot 46 of P/L member could be used for both cables. Cable 144 is slidingly housed in the jacket 45 and is connected to the conventional ignition lock mechanism 38 depicted in FIG. 1.

However, in this second embodiment, the solenoid is completely omitted from the mechanical link between the ignition lock mechanism and the P/L member 134. Instead, a solenoid 160A is mounted to a support bracket 143 by means of a clamping bracket 149, Which also supports the end of cable jacket 45. The solenoid 160A preferably may be identical to solenoid 160 of FIGS. 4 and 5, but also may typically be of a more standard configuration, in which the plunger (not shown) need not be hollow or have an axial opening through it but simply include means for connecting the flexible cable 144 to the outermost end thereof. However, in accordance with the principles of the present invention, the interconnecting engagement principles between the cable 44 and the plunger 162 of the solenoid 160, with its manufacturing advantages, are preferred for the second embodiment as well.

Regardless, the solenoid 160A may be connected in the brake light power circuit in the same manner as previously depicted and discussed with respect to FIG. 8.

Having thus described at least one exemplary embodiment of the invention, that which is new and desired to be secured by Letters Patent is claimed below:

1. In a brake/shift interlock for use in a vehicle having a shift control mechanism for an automatic transmission, the transmission having a "Park" mode and modes other than Park, the shift control mechanism having a shift lever for controlling selection of the transmission modes, a detent mechanism having a latch and latch plate, the latch being adapted to be in detented engagement with respective detent notches in the latch plate, one of said detent notch coinciding with a Park position of the shift lever, and the latch being selectively, manually actuable out of said detented engagement with a respective detent notch, and a Park/Lock member actuable to lock the latch in the Park position detent notch, the vehicle having an ignition switch having "Off" and "Run" positions, an ignition lock mechanism associated with the ignition switch and connected with the Park/Lock member for actuating the Park/Lock member to a "Lock" position to maintain the latch locked in the Park position detent notch when the ignition switch is in its Off position, and a brake switch connected in an electrical power circuit, and adapted to be actuated in conjunction with the actuation of the vehicle brakes, an improvement in the brake/shift interlock, comprising:
an electromagnetic actuator including a solenoid having a plunger, said solenoid plunger having a stepped, axial opening through it;
electrical means for connecting said electro-magnetic actuator electrically into the power circuit including the brake switch to control operation of said actuator as a function of the actuation of the brake switch;

the ignition lock mechanism including a substantially inelastic line connected to the Park/Lock member;

a substantially inelastic, mechanical connecting line mechanically connecting said plunger of said electromagnetic actuator in line with the movement of the Park/Lock member, said electromagnetic actuator being energizable for placing said connecting line in tension and urging the Park/Lock member toward the Lock position, said connecting line extending through said axial opening in said plunger and having a laterally extended element engaging the stepped portion of said axial opening, causing said line and said plunger to move in unison due to the stepped engagement between said laterally extended element and said plunger.

2. The brake/shift interlock of claim 1, wherein:

the Park/Lock member is mounted on a pivot axis, and an off-axis force supplied to the Park/Lock member by the ignition lock mechanism operates to actuate the Park/Lock member toward the Lock position, locking the latch in the Park position.

3. The brake/shift interlock of claim 2, wherein:

said electromagnetic actuator is connected with the Park/Lock member by said connecting means, providing an off-axis force thereto substantially in the manner provided by the ignition lock mechanism, both the ignition lock mechanism and said connecting means engaging the Park/Lock member in tension to actuate the Park/Lock member toward the Lock position, effectively locking the latch in the Park position detent notch.

4. The brake/shift interlock of claim 3, wherein:

said electromagnetic actuator and said connecting means exist mechanically in parallel with the ignition lock mechanism.

5. The brake/shift interlock of claim 3, wherein said electromagnetic actuator and said connecting means are connected mechanically in series with the ignition lock mechanism, the inelastic line connected to the Park/Lock member being the same, continuous, substantially inelastic line connecting said plunger of said electromagnetic actuator in line with the movement of the Park/Lock member.

6. The brake/shift interlock of claim 1, wherein:

said stepped, axial opening in said plunger of said electromagnetic actuator is formed by two, in-line, cylindrical, axially coincident, axial openings of different diameters.

7. The brake/shift interlock of claim 1, wherein:

when the ignition switch is in the Run position, the power circuit is operative when said solenoid is connected therein to apply an energizing potential across said solenoid and the brake switch is effectively connected in parallel across said solenoid, the brake switch being normally open and being operative upon its said actuation in conjunction with brake actuation to deenergize said solenoid.

8. The brake/shift interlock of claim 7, wherein the power circuit further includes:

a lamp, one side of the ignition switch being connected to the energizing potential, the other side of the ignition switch being connected to one side of said solenoid, the other side of said solenoid being connected to a junction including one side of a lamp and one side of the brake switch, the other side of the lamp being connected to ground potential and the other side of the brake switch being connected to substantially the same potential as said energizing potential.

9. In combination in a vehicle having brakes, an ignition switch having "Off" and "Run" positions and a shift control mechanism for an automatic transmission having a "Park" mode and modes other than Park, the shift control mechanism having a shift lever for controlling selection of the transmission modes, a detent mechanism having a latch and a latch plate, the latch being adapted to be in detented engagement with respective detent notches in the latch plate, one detent notch coinciding with the Park position of the shift lever and the latch being selectively, manually actuable out of the detented engagement with a respective detent notch, and a Park/Lock member actuable to lock the latch in the Park position detent notch, an ignition lock mechanism associated with the ignition switch and connected with said Park/Lock member for actuating said Park/Lock member to a Lock position to maintain the latch lock in said Park position detent notch when the ignition switch is in its Off position, a brake switch connected in an electrical power circuit and adapted to be actuated in conjunction with the actuation of the brakes, and a brake/shift interlock comprising a solenoid, a connecting line connecting the solenoid electrically in the power circuit including the brake switch to control operation of the solenoid as a function of the actuation of the brake switch, and a connecting line mechanically connecting the solenoid directly with the Park/Lock member, the solenoid being energizable to tension the connecting line maintaining the Park/Lock member in the Lock position, wherein:

said solenoid has a longitudinally movable plunger, said plunger having a stepped, axial opening through it, and said connecting line comprises a cable extending through said axial opening in said plunger and being in common movement engagement therewith.

10. The combination of claim 9, wherein the Park/Lock member is pivotally mounted on a pivot axis, and both said ignition lock mechanism and said brake/shift interlock are connected to said Park/Lock member to provide respective off-axis tensile forces thereto for actuating said Park/Lock member to said Lock position.

11. The combination of claim 10, wherein:

said solenoid and said connecting line are connected mechanically in series with said ignition lock mechanism.

12. The combination of claim 11, wherein:

said opening through said plunger is formed by two, in-line, connected, cylindrical axially coincident, communicating, axial openings of different diameters, a seat being formed at the interfacing between said connected openings; and said substantially inelastic line extends axially completely through said connected openings and through said solenoid.

13. The combination of claim 9, wherein:

when the ignition switch is in the Run position, said power circuit is operative when said solenoid is connected therein to apply an energizing potential across said solenoid, and said brake switch is effectively connected in parallel across said solenoid, said brake switch being normally open and being operative upon its said actuation in conjunction with brake actuation to deenergize said solenoid.

* * * * *